(12) United States Patent
Chen et al.

(10) Patent No.: US 11,011,780 B2
(45) Date of Patent: May 18, 2021

(54) ELECTROLYTE COMPOSITION AND APPLICATION THEREOF

(71) Applicant: ETERNAL MATERIALS CO., LTD., Kaohsiung (TW)

(72) Inventors: Wei-Chih Chen, Kaohsiung (TW); Tu-Yi Wu, Kaohsiung (TW); Chih Hsien Wang, Kaohsiung (TW); Yi-Fang Jung, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 166 days.

(21) Appl. No.: 16/177,710

(22) Filed: Nov. 1, 2018

(65) Prior Publication Data
US 2019/0140320 A1    May 9, 2019

(30) Foreign Application Priority Data

Nov. 3, 2017 (TW) ................................. 106138210
Sep. 6, 2018 (TW) ................................. 107131371

(51) Int. Cl.
| | |
|---|---|
| *H01M 10/0567* | (2010.01) |
| *H01M 10/0569* | (2010.01) |
| *H01M 10/0568* | (2010.01) |
| *H01M 10/0525* | (2010.01) |

(52) U.S. Cl.
CPC ... *H01M 10/0567* (2013.01); *H01M 10/0568* (2013.01); *H01M 10/0569* (2013.01); *H01M 10/0525* (2013.01); *H01M 2300/0037* (2013.01)

(58) Field of Classification Search
CPC ....................... H01M 10/0568; H01M 10/0567
See application file for complete search history.

(56) References Cited

U.S. PATENT DOCUMENTS

2006/0269846 A1    11/2006    Xu et al.

FOREIGN PATENT DOCUMENTS

| CN | 107293792 A | * 10/2017 |
|---|---|---|
| JP | 2002-260729 | 9/2002 |
| JP | 2003-160667 | 6/2003 |
| WO | 2007/095812 | 8/2007 |

OTHER PUBLICATIONS

Japanese Office Action and English Translation thereof for Application No. JP 2018-207234.
JP 2003-160667 A_Espacent English Abstract.
JP 2002-260729 A_Espacent English Abstract.

* cited by examiner

*Primary Examiner* — Jonathan G Jelsma
(74) *Attorney, Agent, or Firm* — Ladas & Parry LLP

(57) ABSTRACT

An electrolyte composition including a heterocyclic compound, an electrolyte salt and a solvent is provided. The heterocyclic compound includes, in the heterocyclic ring: (a) at least two nitrogen atoms each of which is bonded to a —Si(R$_1$)$_3$ group; and (b) at least one carbonyl group (C=O) or thiocarbonyl group (C=S), wherein R$_1$ is a C$_{1-3}$ alkyl group or an aryl group.
The electrolyte composition of the present disclosure is suitable for an electrochemical device. Electrochemical devices, in particular batteries, using the electrolyte composition of else present disclosure are capable of efficiently inhibiting the moisture and acidity therein, thereby stabilizing the electrolyte salt therein, and preventing the electrolyte salt from being further decomposed and from producing hydrogen fluoride.

11 Claims, 1 Drawing Sheet

ELECTROLYTE COMPOSITION AND APPLICATION THEREOF

BACKGROUND

1. Technical Field

The present disclosure relates to an electrolyte composition, and more particularly to an electrolyte composition suitable for an electrochemical device (for example, a secondary battery).

2. Description of the Related Art

An electrolyte refers to a compound that generates free ions and is electrically conductive in an aqueous solution or in a molten state. Based on this characteristic, the electrolyte composition can be used in various electrochemical devices such as batteries, capacitors, and electroplating baths, etc., and an electrically conductive path of the device is provided by the free ions generated therefrom.

A secondary battery is an electrochemical battery, which is also known as a rechargeable battery. Similar to conventional batteries, the secondary battery comprises a positive electrode, a negative electrode, and an electrolytic composition, in which chemical energy is converted into electrical energy by a chemical reaction during discharge. However, unlike the conventional batteries, the chemical reaction of the secondary battery is a reversible reaction. After the secondary battery is discharged, the above chemical reaction can be reversed by an external power source to restore the chemically changed substance to its original state, that is, by charging. The charged secondary battery can be used again. Therefore, the secondary battery can be cyclically charged and discharged. Common secondary batteries available from the market include lead-acid batteries, nickel-cadmium batteries, nickel-hydrogen batteries and lithium-ion batteries. Different batteries have different applications due to their differences in the properties, such as working voltage, capacity and safety. Among them, lithium-ion batteries are widely used as driving power sources for portable devices, in electric vehicles or as reserve power supply due to their relatively light weight, high capacity (high energy density), high working voltage, chargeable cycle and high cycle life.

The negative electrode material of the lithium ion battery may be lithium metal, lithium alloys, carbon, materials (such as coke, artificial graphite, natural graphite or mesocarbon microbeads), silicon or silicon-carbon materials, among which silicon having the highest theoretical specific capacity (4,200 mAh/g) is one of the ideal choices for increasing the energy density of lithium batteries. However, the electrical conductivity of silicon itself is low, and the volume variation rate of silicon during the charging and discharging processes is large, so it is difficult to form a stable solid-electrolyte interface (SEI) film (also referred to as a passivation film) on the surface. The SEI film is an electrical insulator, but an excellent conductor of lithium ions, and lithium ions can pass freely through the SEI film. The SEI film is stable in an organic electrolyte solution and is capable of isolating the solvent from the electrode. The solvent in the electrolyte solution is easily reduced and decomposed on the negative electrode (especially the negative electrode at a high temperature). The reduction and decomposition of the solvent may result in the formation of precipitates, the generation of gas and the expansion of the electrode, thereby affecting the mobility of lithium ions and reducing the cycle life of the battery. To avoid the reduction in the cycle performance and service life of the electrode due to the damage of the electrode caused by the solvent, the development of the electrolyte solution with respect to the negative electrode is mainly focused on forming a stable and intact SEI film on the surface of the negative electrode material so as to solve the problem of cycle stability of the battery and overcome the problem of volume expansion during the charge and discharge of the battery.

There are two main categories of the positive electrode materials of lithium ion batteries: lithium iron phosphate (LFP) and ternary materials. The battery with lithium iron phosphate as a positive electrode material has the advantages of good cycle performance and reliable safety performance, but has the disadvantages of insufficient energy density and poor performance at a low temperature, in which insufficient energy density is the main bottleneck limiting the development of such batteries. The battery with a ternary material as the positive electrode material is composed of different elements, mainly nickel-cobalt-manganese (NCM) or nickel-cobalt aluminum (NCA) which can be represented by the general formula $LiNi_{1-x-y-z}Co_xMn_yAl_zO_2$. For a battery in which the positive electrode material is nickel-cobalt-manganese, the material cost is reduced because of the use of inexpensive nickel and manganese and a relatively small amount of cobalt. Moreover, the nickel-cobalt-manganese material is structurally stable over a voltage range of 4.35-4.6 V, so a battery using the nickel-cobalt-manganese material as a positive electrode is also stable at a high voltage. However, commercially available electrolyte solutions for the ternary power battery with 4.35 V or more are still immature at present, mainly due to the problem that the ternary material has a large specific surface area and contains nickel with high oxidizability. Nickel tends to absorb moisture in the electrolyte solution (even in trace amounts), leading to loss of activity, and is easily to react with the electrolyte salt in the electrolyte composition, whereby the performances of the battery, particularly, the cycle performance and high-temperature storage stability; are affected.

The solvent in the electrolyte composition of a common lithium ion battery is an organic solvent, and the electrolyte salt thereof is a lithium salt. Lithium hexafluorophosphate ($LiPF_6$) is a commonly used lithium salt that has high energy density, good electrochemical stability and excellent electrical conductivity, but is prone to thermal decomposition and hydrolysis, especially in a silicon-containing electrode where an aqueous binder (such as polyacrylic acid; PAA) is frequently used which makes the moisture content in the electrode plate higher. The thermal decomposition reaction of lithium hexafluorophosphate is as follows:

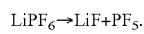

$$LiPF_6 \rightarrow LiF + PF_5.$$

Lithium hexafluorophosphate may also react with a trace amount of water in the electrolyte solution:

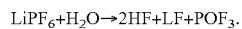

$$LiPF_6 + H_2O \rightarrow 2HF + LF + POF_3.$$

The lithium battery generally operates at a temperature of −30 to 60° C. The hydrolysis and thermal decomposition become more intense in a high-temperature environment, the resulting acid not only erodes the electrode material but also damages the SEI film, and therefore, the battery performance is rapidly deteriorated. Therefore, during the preparation of an electrolyte solution for a lithium ion battery, the moisture content of the obtained electrolyte solution is generally controlled to be 20 ppm or less, and the acidity is controlled to be 50 ppm or less. However, even so, other materials in the electrolyte solution may introduce moisture or acidity from various sources during the use of the battery, resulting in deterioration of the quality of the electrolyte solution. Therefore, the development of an electrolyte additive having the function of water removal and acid reduction to eliminate or reduce the existing or externally introduced water and acid in an electrolyte solution is of practical value.

Besides, $PF_5$ produced by the decomposition of lithium hexafluorophosphate is chemically active and easily reacts with additives or impurities in the electrolyte solution so that soluble monomers, dialers and oligomers are produced. As the conjugated system in the polymer increases, the polymer spectrum is red-shifted, chromophores can be found and the chromaticity of the electrolyte solution increases. Therefore, the chromaticity of the electrolyte solution can be used as a reference for the stability of lithium hexafluorophosphate.

In order to address the above bottlenecks in the field, there is a need at present in the industry for an electrolyte composition that removes water and reduces acidity, is beneficial to the SEI film and does not polymerize with impurities, thereby enabling the electrochemical device to maintain its cycle stability and volume stability at high temperatures and high voltages.

SUMMARY

An object of the present disclosure is to provide an electrolyte composition which can interact with moisture, thereby stabilizing the lithium salt in the electrolyte solution, and avoiding further hydrolysis of the electrolyte, generation of hydrogen fluoride and erosion of the electrode. The electrolyte composition comprises a heterocyclic compound, an electrolyte salt and a solvent, wherein the heterocyclic compound comprises in the heterocyclic ring:
(a) at least two nitrogen atoms each of which is bonded to a —Si(R$_1$)$_3$ group; and
(b) at least one carbonyl group (C=O) or thiocarbonyl group (C=S),
wherein R$_1$ is a C$_{1-3}$ alkyl group or an aryl group.

Due to the presence of the heterocyclic compound in the electrolyte composition of the present disclosure, not only can the moisture present in the battery be effectively removed, but the acid generated due to hydrolysis or deterioration of the electrolyte salt can also be effectively reduced. Further, the electrolyte composition comprising the heterocyclic compound according to the present disclosure also produces a compound that facilitates the formation of the SEI film while removing water and reducing acid. Therefore, the electrolyte composition comprising the heterocyclic compound has better stability in comparison with common electrolyte compositions.

Another object of the present disclosure is to provide an electrochemical device comprising the above electrolyte composition.

DETAILED DESCRIPTION

Figure 1:
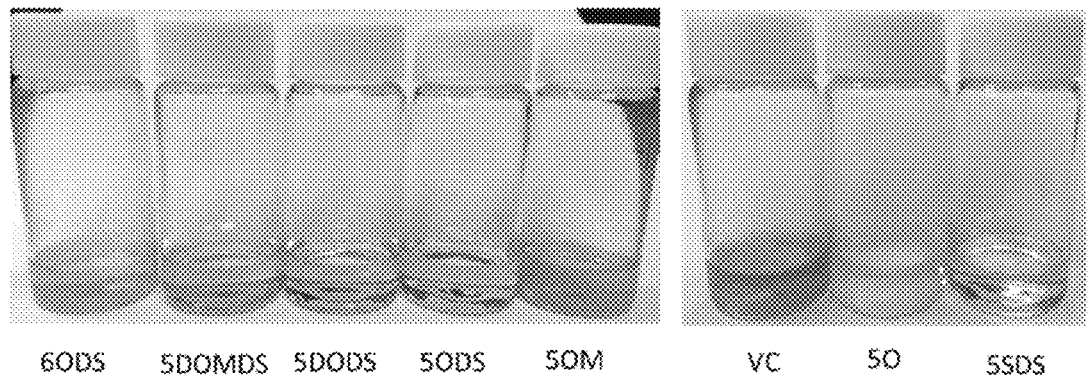
FIG. 1 shows the chromaticity of the electrolyte composition obtained in each of the examples and the comparative examples of the present disclosure after storage at 60° C. for 10 days.

In order to facilitate the understanding of the disclosure herein, terms are hereby defined below.

The term "about" refers to an acceptable deviation of a given value measured by a person of ordinary skill in the art, depending, in part, on how to measure or determine the value.

In the present disclosure, the term "alkyl" refers to a saturated, straight or branched hydrocarbon group, which comprises preferably 1-20 carbon atoms. Examples include, but are not limited to, methyl, ethyl, n-propyl isopropyl, n-butyl, isobutyl, tert-butyl, pentyl, hexyl and the like.

Heterocyclic Compound

The heterocyclic compound of the present disclosure can maintain the battery performance while maintaining stability and is suitable for use as an electrolyte additive.

In some embodiments of the present disclosure, the heterocyclic compound described in the present disclosure is a 4- to 7-membered heterocyclic compound. As described above, the heterocyclic compound comprises, in the heterocyclic ring: (a) at least two nitrogen atoms each of which is bonded to a —Si(R$_1$)$_3$ group; and (b) at least one carbonyl group (C=O) or thiocarbonyl group (C=S), wherein R$_1$ is a C$_{1-3}$ alkyl group or an aryl group.

In some embodiments, the heterocyclic compound of the present disclosure may be a 4-, 5-, 6- or 7-membered heterocyclic compound, preferably a 4-, 5- or 6-membered heterocyclic compound, and more preferably a 5- or 6-membered heterocyclic compound; the heterocyclic compound comprises, in the heterocyclic ring, two or more nitrogen atoms each of which is bonded to a —Si(R$_1$)$_3$ group, for example, but not limited to, two or three nitrogen atoms each of which is bonded to a —Si(R$_1$)$_3$ group, wherein R$_1$ is a C$_{1-3}$ alkyl group or an aryl group, and preferably a methyl or ethyl group.

According to a specific embodiment of the present disclosure, the heterocyclic compound is a 4- to 7-membered heterocyclic compound having a structure of Formula (I):

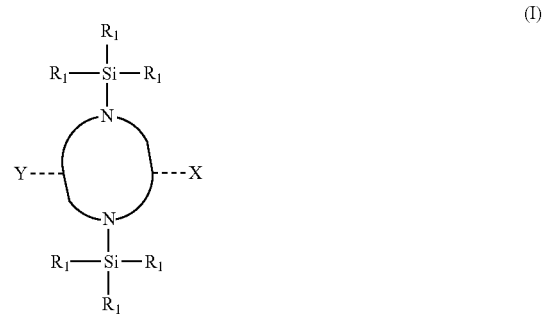

wherein:
R$_1$ is as defined above; and
Each of the " . . . " individually and independently represent two single bonds or a double bond; when " . . . " represents two single bonds, X mid Y individually and independently represent H, and when the " . . . " represents a double bond, X and Y individually and independently represent O or S.

The —N—Si(R$_1$)$_3$ group in the heterocyclic ring of the heterocyclic compound according to the present disclosure can react with water to produce a corresponding compound (1) containing a —NH group and a silanol. For example, it can react with water in the electrolyte composition, and the reaction is as follows (without being bound by theory):

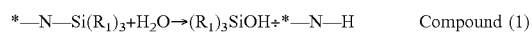

Therefore, by adding a heterocyclic compound according to the present disclosure as an electrolyte additive, undesired moisture in an electrochemical device (for example, a secondary battery) can be removed. Further, the inventors of the subject application have found that the corresponding compound (1) produced therefrom has excellent heat resistance. In some embodiments of the present disclosure, when the electrolyte composition is used in a secondary battery, compound (1) can be used as a film (SEI film)-forming auxiliary agent in the secondary battery, which improves the stability of the electrolyte solution and the negative electrode of the battery at a high temperature.

In addition to water, the —N—Si(R$_1$)$_3$ group in the heterocyclic ring of the heterocyclic compound of the present disclosure can also react with an acid to produce a corresponding compound (1) containing a —NH group and a silicide. For example, it can react with an acid (e.g. hydrofluoric acid) in the electrolyte composition, and the reaction is as follows (without being bound by theory):

*—N—Si(R$_1$)$_3$+HF→(R$_1$)$_3$SiF+*—N—H          Compound (1)

Therefore, by adding a heterocyclic compound according to the present disclosure as an electrolyte additive, undesired acidity in an electrochemical device can be reduced. Further, the corresponding compound (1) produced by the reaction with an acid can be used as a film (SEI film)-forming auxiliary agent in a secondary battery as described above, which can improve the stability of the negative electrode and the electrolyte solution of the battery at a high temperature.

In some embodiments of the present disclosure, the electrolyte salt in the electrolyte composition generates hydrogen fluoride by hydrolysis. However, the heterocyclic compound of the present disclosure can react with hydrogen fluoride due to the large binding energy between Si and F, and the content of hydrogen fluoride in the electrolyte composition can be reduced.

In addition to the aforementioned nitrogen atoms which are bonded to the —Si(R$_1$)$_3$ groups, the heterocyclic compound of the present disclosure comprises, in the heterocyclic ring, at least one carbonyl group (C=O) or thiocarbonyl group (C=S), for example, but not limited to, one or two carbonyl groups and/or thiocarbonyl groups. In a preferred embodiment of the present disclosure, the heterocyclic compound of the present disclosure has a carbonyl group and/or thiocarbonyl group, where the carbonyl group and/or thiocarbonyl group can form, together with an adjacent nitrogen atom in the heterocyclic ring, an amide group (—C(=O)—N(R)—, in which R is hydrogen or —Si(R$_1$)$_3$) and/or a thioamide group (—C(=S)—N(R)—, in which R is hydrogen or —Si(R$_1$)$_3$). Therefore, the heterocyclic compound of the present disclosure has a carbonyl group (and/or a thiocarbonyl group) which gives a conjugated property with an amino group, and thus is relatively stable and less likely to react with a lithium salt. In addition, the carbonyl and thiocarbonyl groups contained in the heterocyclic compound of the present disclosure also contribute to the dispersion of the heterocyclic compound in the solvent.

According to some preferred embodiments of the present disclosure, the heterocyclic compound of the present disclosure has a high oxidation potential and thus has thermal stability and electrochemical stability at high temperatures and pressures.

According to some preferred embodiments of the present disclosure, the heterocyclic compound is a 5- or 6-membered heterocyclic compound and R$_1$ is a methyl group. The heterocyclic compound has a structure of Formula (II):

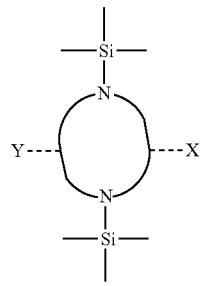

(II)

where
" . . . " is a double bond, and X and Y individually and independently represent O or S.

According to some preferred embodiments of the present disclosure, the heterocyclic compound is for example, but not limited to,

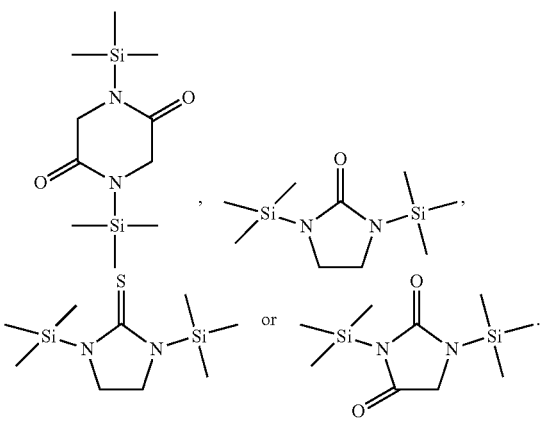

The heterocyclic compound of the present disclosure can be used to remove acid and reduce water and is stable at high temperatures. Therefore, the electrolyte composition of the present disclosure can be maintained stable for a long period of time (e.g., 10 days) at a high temperature (e.g., 60 degrees Celsius).

In one embodiment of the present disclosure, the heterocyclic compound optionally composes, in the heterocyclic ring, one, two, three or four carbon atoms each of which is bonded to a C$_{1-3}$ alkyl group, and preferably comprises one, two, or three carbon atoms each of which is bonded to a C$_{1-3}$ alkyl group, where the C$_{1-3}$ alkyl group is preferably a methyl or ethyl group.

Electrolyte Salt

The electrolyte salt functions to transfer the charge between the positive and negative electrodes of the battery. The suitable electrolyte salt used in the present disclosure is not particularly limited, and is determined mainly depending on the type of the electrochemical device or the electrochemical battery.

According to an embodiment of the present disclosure, the suitable electrolyte salt used in the present disclosure is a lithium salt. The lithium salt may be selected from the group consisting of: LiPF$_6$, LiBF$_4$, LiAsF$_6$, LiTaF$_6$, LiAlCl$_4$, Li$_2$B$_{10}$Cl$_{10}$, LiCoO$_2$, LiClO$_4$, LiCF$_3$SO$_3$, LiN(SO$_2$C$_m$F$_{2m+1}$)(SO$_2$C$_n$F$_{2n+1}$), LiC(SO$_2$C$_k$F$_{2k+1}$)(SO$_2$C$_m$F$_{2m+1}$)(SO$_2$C$_n$F$_{2n+1}$), LiN(SO$_2$C$_k$F$_{2k}$CO$_2$), LiC(SO$_2$C$_k$F$_{2k}$SO$_2$)(SO$_2$C$_m$F$_{2m+1}$), LiPF$_x$(RF)$_{6-x}$, LiBF$_y$(RF)$_{4-y}$ or a combination thereof, in which k=0-10, m=0-10, n=0-10, x=0-5, y=0-3 and RF represents a $C_{1-20}$ perfluoroalkyl group or an aryl group. Preferred electrolyte salts include $LiPF_6$, $LiBF_4$, $LiSbF_6$, $LiAsF_6$, $LiN(SO_2CF_3)_2$, $LiN(SO_2C_2F_5)_2$, $LiN(SO_2CF_3)_3$, $LiN(SO_2F)_2$ or a combination thereof. The above electrolyte salt can enhance the electrochemical stability and electrical conductivity of the electrolyte composition.

Solvent

The solvent in the electrolyte composition of the present disclosure is not particularly limited, and may be any suitable non-aqueous organic solvent known to persons of ordinary skill in the art.

According to an embodiment of the present disclosure, the solvent used in the present disclosure may be a non-aqueous organic solvent which is a mixture of a cyclic carbonate and a chain carbonate. The cyclic carbonate comprises ethylene carbonate, propylene carbonate, butylene carbonate or a combination thereof, and the chain carbonate comprises dimethyl carbonate, diethyl carbonate, methyl ethyl carbonate, methyl propyl carbonate or a combination thereof, among which ethylene carbonate and diethyl carbonate are preferred.

Other Additives

According to an embodiment of the present disclosure, the electrolyte composition of the present disclosure may further comprise at least one additive selected from vinylene carbonate, vinyl ethylene carbonate, fluoroethylene carbonate, 1,3-propane sultone, 1,3-propene sultone, γ-butyrolactone, 1,4-butane sultone and a combination thereof.

According to a preferred embodiment of the present disclosure, the additive comprises vinylene carbonate, vinyl ethylene carbonate, fluoroethylene carbonate, or a combination thereof.

According to another preferred embodiment of the present disclosure, the additive comprises at least one compound selected from the group consisting of vinylene carbonate, vinyl ethylene carbonate, and fluoroethylene carbonate, and optionally a cyclic lactone, which may be 1,3-propane sultone, 1,3-propene sultone, γ-butyrolactone, 1,4-butane sultone or a combination thereof.

The inventors of the subject application have found that the above additive can be used as a film (SEI film)-forming auxiliary agent so that an SEI film can be formed on the surface of the negative electrode during the first charging process to further prevent the decomposition of solvent molecules and improve the performances of the electrolyte composition at high temperatures, thereby improving the thermal stability of the electrolyte.

Electrolyte Composition of the Present Disclosure

As described above, the electrolyte composition of the present disclosure comprises a heterocyclic compound, an electrolyte salt and a solvent.

According to a preferred embodiment of the present disclosure, the content of the heterocyclic compound is, based on the total weight of the electrolyte composition, in the range of 0.01 to 5 wt %, for example, 0.01 wt %, 0.05 wt %, 0.2 wt %, 1 wt %, 2 wt %, 3 wt %, 4 wt %, or 5 wt %, and preferably 0.2 to 2 wt %. When the content of the heterocyclic compound is less than 0.01 wt %, it is difficult to achieve the effect of removing water and reducing acid. When the content of the heterocyclic compound exceeds 5 wt %, the heterocyclic compound is limited in the operation; it is not easy to be uniformly dispersed in the electrolyte solution, and the resulting SEI film is overly thick and affects the electrical impedance.

The content of the electrolyte salt contained in the electrolyte composition of the present disclosure is not particularly limited, and may be any suitable content known to persons of ordinary skill in the art or may be adjusted as needed by persons of ordinary skill in the art. According to an embodiment of the present disclosure, the volumetric molar concentration of the electrolyte salt is in the range between 0.5 M and 2 M, such as 0.5 M, 1 M, 1.5 M or 2 M; or the weight percent concentration of the electrolyte salt is in the range between 7 wt % and 30 wt %, such as 7 wt %, 8 wt %, 10 wt %, 15 wt %, 20 wt %, 25 wt %, 28 wt % or 30 wt %.

According to another preferred embodiment of the present disclosure, the electrolyte composition further comprises other additives. When other additives are present, the content of the other additives is, based on the total weight of the electrolyte composition, in the range of 0.5 wt % to 10 wt %, for example, 0.5 wt %, 1 wt %, 2 wt %, 4 wt %, 6 wt %, 8 wt % or 10 wt %, and preferably 5 to 10 wt %. When the content of the additive is less than 0.5 wt %, it is difficult to form a SEI film sufficiently on the surface of the negative electrode, so that it is difficult to sufficiently improve the performance of the secondary battery electrolyte at high temperatures. When the content of the additive exceeds 10 wt %, the additive forms an overly thick SEI film on the negative electrode, the internal resistance of the battery is increased and a large amount of gas is produced, thereby lowering the low-temperature and high-temperature performances of the battery.

The electrolyte composition of the present disclosure has the characteristics of low moisture, low acidity, and high stability at high temperatures, and is advantageous for forming an SEI film. Therefore, it is suitable for an electrochemical device that requires water removal, acid reduction and high temperature stability.

When the electrolyte composition of the present disclosure is applied to an electrochemical battery, the stability of the electrochemical battery at a high temperature under a high pressure can be improved, where the stability of the electrochemical battery and the electrolytic composition can be determined by using the chromaticity of the electrolyte composition as a reference.

Applications of the Electrolyte Composition of the Present Disclosure

The present disclosure provides use of the above-mentioned electrolyte composition in an electrochemical device, and an electrochemical device comprising the above-mentioned electrolyte composition.

The electrolyte composition of the present disclosure comprises the above-mentioned heterocyclic compound. Because the heterocyclic compound has the characteristics of good water removal, acid reduction and high temperature resistance, and is compatible with lithium-based electrochemical devices, the electrolyte composition of the present disclosure is very suitable for use in various electrochemical devices, such as batteries, capacitors and electroplating baths.

The electrolyte composition of the present disclosure can be used in capacitors which, for example, but are not limited to, supercapacitors or lithium ion supercapacitors (LICs). Due to the use of porous carbon materials, it is difficult to remove water from these capacitors and thus they have a declined service life. In particular, additives having the characteristics of water removal and high voltage resistance are in high demand for LICs because of the higher voltage (>4 V). The electrolyte composition of the present disclosure has good water removal and acid reduction effects and high-pressure stability, and is suitable for lithium ion supercapacitors.

The electrolyte composition of the present disclosure can be applied to a secondary battery which, for example, but is not limited to, a lithium ion battery. Since the electrolyte composition of the present disclosure can reduce the acid content, the metal in the positive electrode will not experience accelerated precipitation caused by the acid at high voltages, and is thus stable. The negative electrode has a stable SEI film on the surface due to the film-forming auxiliary agent formed through the reaction of the electrolyte composition with water or the acid, and thus has surface stability. Accordingly, the secondary battery using the electrolyte composition of the present disclosure has superior cycle characteristics, high-temperature storage performance and capacity.

By simply using existing manufacturing techniques and equipment, the electrolyte composition of the present disclosure can be applied to existing lithium-based electrochemical, devices, particularly secondary batteries (such as lithium ion batteries), without significantly modifying the structure of the lithium ion battery or additionally adding complicated ingredients as additives.

The present disclosure will now be described in connection with the following examples. The present disclosure may be implemented in other ways than the following examples without departing from the spirit of the present disclosure; and the scope of the present disclosure should not be explained merely in accordance with and limited by the disclosure. In addition, unless otherwise stated herein, the terms "a", "an", "the" and similar terms used herein (especially in appended claims) should be construed as including singular and plural referents. The term "about" is used to modify a measurement, including an acceptable error, depending in part on how to determine the value by a person of ordinary skill. The word "or" in the list of two or more items covers all of the following interpretations; any of the items in the list, all items in the list, and any combination of items in the list.

EXAMPLES

Preparation of Electrolyte Composition

In an inert environment with a moisture content of less than 1 ppm and an oxygen content of less than 5 ppm, 37.5 parts by weight of the solvent ethylene carbonate (EC) was well mixed with 37.5 parts by weight of diethyl carbonate (DEC). To the mixed solvent, 15 parts by weight of lithium hexafluorophosphate was slowly added, and stirred until it was completely dissolved to obtain a mixed solution. 2 parts by weight of the heterocyclic compound listed in Table 1 (which may be synthesized or commercially-available) and 8 parts by weight of fluoroethylene carbonate (FEC) were added to the mixed solution, and mixed well to obtain the electrolyte compositions of the examples and comparative examples.

Test Methods of Electrolyte Composition
1. Moisture Test

The method used for determining the moisture content in the present disclosure is the conventional Karl Fischer method. The electrolyte compositions prepared in the examples and comparative examples were placed in a colorless and transparent reagent bottle, and the moisture content in the electrolyte composition was determined by the Karl Fischer method at 30° C. at 0 hours and after 48 hours of storage. The test results are shown in Table 1.

2. High-Temperature Storage Test

The electrolyte compositions prepared in the examples and comparative examples were transferred to an oven at 60° C. for 10 days. The observed states of the electrolyte solution after storage at elevated temperatures are shown in FIG. 1 and reported in Table 1.

FIG. 1 shows that the electrolyte compositions obtained in the examples according to the present disclosure have low chromaticity after 10 days of storage at 60° C. compared to the electrolytic compositions obtained in the comparative examples (using heterocyclic compound VC, 5OM or 5O). The low chromaticity can be used as evidence of superior stability of the electrolyte salt in the electrolyte composition according to the present disclosure.

Test Method of Battery Performances
1. Preparation of Negative Electrode 83.7 parts by weight of artificial graphite (T8; Tianjin Jinmei), 0.5 parts by weight of conductive carbon black (Super P from Taiwan Maxwave Co., Ltd.), 9.3 parts by weight of silicon powder (ANI720 supplied by AUO Crystal Corp.), 1 part by weight of graphene (manufactured by Eternal Materials Co., Ltd.), 2.4 parts by weight of the binder styrene butadiene rubber (SBR; TRD104N supplied by JSR), 0.6 parts by weight of the thickener carboxymethylcellulose (CMC; BVH8 supplied by Ashland) and 2.5 parts by weight of polyacrylic acid (PAA; Etersol-1730 manufactured by Eternal Materials Co., Ltd.) were fully stirred and well mixed in deionized water to produce a slurry of the negative electrode material.

The slurry of the negative electrode material was blade-coated onto a copper foil (a copper foil of a 10 μm for battery; supplied by Changchun Co., Ltd.), dried at 100° C. for 5 minutes, and then cold pressed to prepare a negative electrode plate (where the density of the coating alter pressing is 7 mg/cm$^3$).

The resulting negative electrode plate was cut into plates having a diameter of 1.2 cm, and assembled with other components into a standard coin battery in an inert atmosphere by a conventional method, and the battery performance was tested. The components were assembled in an order of: bottom cover of the battery, lithium metal plate (as positive electrode), separator, negative electrode plate, metal gasket, leaf spring sheet and top cover of the battery. The electrolyte solution used was the electrolyte composition obtained in the examples and comparative examples, and the separator was a polypropylene film having a thickness of about 20 μm.

The assembled battery was allowed to stand for about 2 to 3 hrs, so that the electrolyte solution was sufficiently penetrated into the electrode to increase the electrical conductivity, and the open circuit voltage of the obtained battery was about 2.5 to 3 V.

2. Capacity Retention Rate Test

Battery performance was measured using a charge and discharge machine (Model: LBT21084) available from Arbin Instruments.

Pre-Process:

Charge: The battery was charged for 10 hrs at a constant current of 0.1 C, and then charged for 1 hr at a constant voltage of 0.01 V.

Discharge: The battery was discharged at a current of 0.1 C for 10 hrs.

The charge and discharge process were repeated 3 times under the above conditions, where the first 3 cycles were used to form a solid electrolyte interface.

Discharge capacity of the first and fiftieth cycles:
Charge: The battery was charged for 5 hrs at a constant current of 0.2 C, and then charged for 1 hr at a constant voltage of 0.01 V.
Discharge: The battery was discharged at a current of 0.3 C for 2 hrs.

The above three cycles for forming a solid electrolyte interface were included in calculation, and the discharge capacity measured in the fourth cycle was regarded as the discharge capacity of the first cycle.

After repeating the charge and discharge process for 49 times under the above conditions, the discharge capacity measured in the 50th cycle was the discharge capacity of the 50th cycle.

Capacity retention rate=(discharge capacity of the 50th cycle/discharge capacity of the first cycle)×100%.

Figure 2:
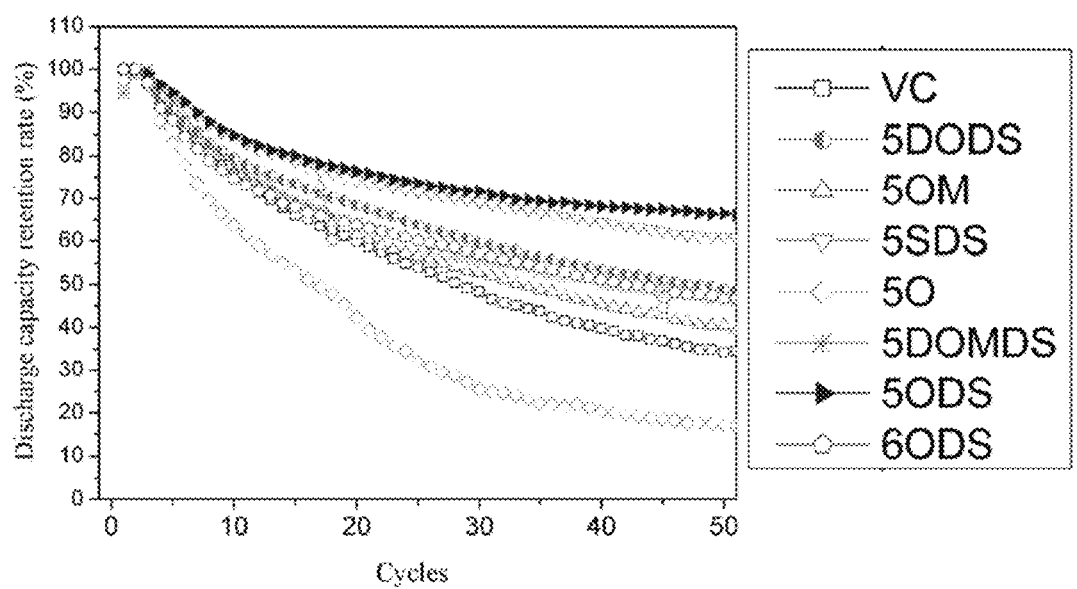
FIG. 2 shows the relationship between the discharge capacity retention rate (%) and the number of cycles when the electrolyte composition obtained in each of the examples and the comparative examples of the present disclosure is used with a silicon-carbon negative electrode.

FIG. 2 shows the capacity retention rate of each of the examples and the comparative examples. The capacity retention rate was calculated using the above formula and recorded in Table 1. As can be seen from Table 1, the battery using the electrolyte composition containing a heterocyclic compound obtained in the examples according to the present disclosure has a better discharge capacity retention rate when used with a silicon-carbon negative electrode, compared with the comparative examples.

TABLE 1

| | Heterocyclic compound | | Moisture content (ppm) | | State upon storage at high temperatures at 60° C. for 10 days | Battery Capacity retention rate |
|---|---|---|---|---|---|---|
| | Abbreviation | Chemical Formula | 0 hr | 48 hr | | |
| Example 1 | 5ODS | 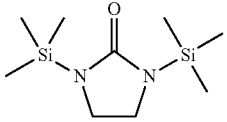 | 17.7 | 5.5 | Transparent and colorless | 66.2% |
| Example 2 | 5SDS | 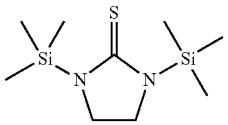 | 18.1 | 6.7 | Transparent and colorless | 60.7% |
| Example 3 | 5DODS | 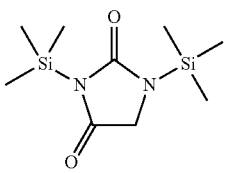 | 16.8 | 6.1 | Transparent and colorless | 48.4% |
| Example 4 | 5DOMDS | 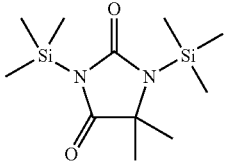 | 17.1 | 7.7 | Transparent and light yellow | 46.2% |
| Example 5 | 6ODS | 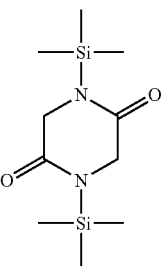 [SMILES: C[Si](C)(C)N1CC(=O)N([Si](C)(C)C)CC1=O] | 15.9 | 4.5 | Transparent and light yellow | 46.8% |
| Comparative Example 1 | VC | 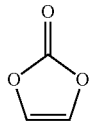 | 15.9 | 17.7 | Precipitate or dark | 34.2% |

TABLE 1-continued

| | Heterocyclic compound | | Moisture content (ppm) | | State upon storage at high temperatures at 60° C. for 10 days | Battery Capacity retention rate |
|---|---|---|---|---|---|---|
| | Abbreviation | Chemical Formula | 0 hr | 48 hr | | |
| Comparative Example 2 | 5OM | (1,3-dimethyl-imidazolidin-2-one structure) | 17.5 | 18.9 | Precipitate or dark | 40.4% |
| Comparative Example 3 | 5O | (imidazolidin-2-one structure, N–H, N–H) | 16.8 | 19.5 | Precipitate or dark | 17.1% |

The above-described embodiments of the present disclosure are intended to be illustrative only. Numerous alternative embodiments may be devised by persons of ordinary skill in the art without departing from the scope of the following claims.

What is claimed is:

1. An electrolyte composition, comprising a heterocyclic compound, an electrolyte salt and a solvent, wherein the heterocyclic compound comprises a heterocyclic ring comprising: (a) at least two nitrogen atoms each of which is bonded to a —Si(R$_1$)$_3$ group; and (b) at least one carbonyl group or thiocarbonyl group, wherein R$_1$ is a C$_{1-3}$ alkyl group or an aryl group, and wherein the heterocyclic ring is a 5- or 6-membered ring.

2. The composition according to claim 1, wherein R$_1$ is a methyl or ethyl group.

3. The composition according to claim 1, wherein the content of the heterocyclic compound is in the range of 0.01 to 5 wt % based on the total weight of the electrolyte composition.

4. The composition according to claim 1, further comprising an additive, wherein the additive comprises vinylene carbonate, vinyl ethylene carbonate, fluoroethylene carbonate, 1,3-propane sultone, 1,3-propene sultone, γ-butyrolactone, 1,4-butane sultone or a combination thereof.

5. The composition according to claim 4, wherein the content of the additive is in the range of 0.5 to 10 wt % based on the total weight of the electrolyte composition.

6. The composition according to claim 1, wherein the weight percent concentration of the electrolyte salt is in the range of 7 to 30 wt %.

7. The composition according to claim 1, wherein the electrolyte salt comprises a lithium salt.

8. The composition according to claim 7, wherein the lithium salt comprises lithium hexafluorophosphate (LiPF$_6$), LiBF$_4$, LiSbF$_6$, LiAsF$_6$, LiN(SO$_2$CF$_3$)$_2$, LiN(SO$_2$C$_2$F$_5$)$_2$, LiN(SO$_2$CF$_3$)$_3$, LiN(SO$_2$F)$_2$, or a combination thereof.

9. The composition according to claim 1, wherein the solvent is a non-aqueous organic solvent formed by mixing a cyclic carbonate and a chain carbonate, the cyclic carbonate comprising ethylene carbonate, propylene carbonate, butylene carbonate or a combination thereof, and the chain carbonate comprising dimethyl carbonate, diethyl carbonate, methyl ethyl carbonate, methyl propyl carbonate or a combination thereof.

10. The composition according to claim 1, wherein the heterocyclic compound further comprises, in the heterocyclic ring, one or two carbon atoms each of which is bonded to a C$_{1-3}$ alkyl group.

11. A method comprising use of the electrolyte composition according to claim 1 in an electrochemical device.

* * * * *